United States Patent
Ramakrishnan et al.

(10) Patent No.: US 10,965,738 B2
(45) Date of Patent: Mar. 30, 2021

(54) CORRELATING AND LOAD BALANCING IMS TRAFFIC IN A VISIBILITY NETWORK

(71) Applicant: Extreme Networks, Inc., San Jose, CA (US)

(72) Inventors: Senthil Kumar Ramakrishnan, Bangalore (IN); Shivaprasad Masanapura Nanjaiah, Bangalore (IN)

(73) Assignee: Extreme Networks, Inc., San Jose, CA (US)

(*) Notice: Subject to any disclaimer, the term of this patent is extended or adjusted under 35 U.S.C. 154(b) by 8 days.

(21) Appl. No.: 16/463,481

(22) PCT Filed: Oct. 24, 2017

(86) PCT No.: PCT/US2017/058114
§ 371 (c)(1),
(2) Date: May 23, 2019

(87) PCT Pub. No.: WO2018/097921
PCT Pub. Date: May 31, 2018

(65) Prior Publication Data
US 2019/0364101 A1 Nov. 28, 2019

(30) Foreign Application Priority Data
Nov. 25, 2016 (IN) .............................. 201641040328

(51) Int. Cl.
*H04L 29/08* (2006.01)
*H04L 12/26* (2006.01)
*H04L 29/06* (2006.01)

(52) U.S. Cl.
CPC .......... *H04L 67/1002* (2013.01); *H04L 43/12* (2013.01); *H04L 65/1006* (2013.01); *H04L 65/1016* (2013.01)

(58) Field of Classification Search
CPC ............. H04L 65/1006; H04L 65/1016; H04L 65/1083; H04L 63/306; H04L 67/1002; H04L 67/146
See application file for complete search history.

(56) References Cited

U.S. PATENT DOCUMENTS 7,907,618 B2    3/2011  Chen
9,219,757 B2*  12/2015  Johns ................. H04L 65/1006
(Continued)

FOREIGN PATENT DOCUMENTS

| EP | 2466799 A1 | 6/2012 |
| RU | 2543565 C1 | 3/2015 |
| WO | WO 2009149759 A1 | 12/2009 |

OTHER PUBLICATIONS

Rosenberg et al. RFC 3261. "SIP: Session Initiation Protocol". pp. 1-269. (Year: 2002).*

(Continued)

*Primary Examiner* — John M MacIlwinen
(74) *Attorney, Agent, or Firm* — Sterne, Kessler, Goldstein & Fox P.L.L.C.

(57) ABSTRACT

Techniques for correlating and load balancing IMS traffic in a visibility network are provided. According to one set of embodiments, a packet broker of the visibility network can receive IMS traffic replicated from an IMS core network and identify control/data packets in the IMS traffic that are part of the same IMS session based on FROM and TO user identities included in the packets. The packet broker can then generate a unique session identifier for the IMS session and add the generated session identifier to the packets. In certain embodiments, the packet broker can further provide the generated session identifier as input to a load balancing algorithm or rule set. The load balancing algorithm or rule set can output an egress port of the packet broker through (Continued)

which the control/data packets should be forwarded based on the session identifier.

21 Claims, 10 Drawing Sheets

(56) References Cited

U.S. PATENT DOCUMENTS

| | | |
|---|---|---|
| 10,243,813 B2 | 3/2019 | Hegde et al. |
| 2005/0009520 A1* | 1/2005 | Herrero ............... H04L 61/1588 455/435.1 |
| 2006/0178132 A1* | 8/2006 | Tammi .................... H04L 63/10 455/411 |
| 2008/0155658 A1* | 6/2008 | Leinonen .......... H04W 12/0609 726/4 |
| 2010/0290392 A1* | 11/2010 | Rasanen ................. H04L 67/14 370/328 |
| 2016/0110211 A1 | 4/2016 | Karnes |
| 2017/0237632 A1* | 8/2017 | Hegde ................... H04L 47/125 370/252 |

OTHER PUBLICATIONS

Peterson and Jennings. RFC 4474. "Enhancements for Authenticated Identity Management in the Session Initiation Protocol (SIP)". pp. 1-41. (Year: 2006).*

International Search Report and Written Opinion of the International Searching Authority directed to related International Patent Application No. PCT/US 2017/058114, dated Mar. 21, 2018, 7 pages.

International Preliminary Report on Patentability directed to related International Application No. PCT/US 2017/058114, dated May 28, 2019, 5 pages.

* cited by examiner

CORRELATING AND LOAD BALANCING IMS TRAFFIC IN A VISIBILITY NETWORK

CROSS-REFERENCES TO RELATED APPLICATIONS

The present application claims the benefit and priority of India Provisional Application No. 201641040328, filed Nov. 25, 2016, entitled "METHOD OF LOAD BALANCING THE IMS TRAFFIC ACROSS NETWORK DATA ANALYTICAL PROBES." The entire contents of this application are incorporated herein by reference in its entirety for all purposes.

BACKGROUND

In the field of computer networking, a visibility network (also known as a "visibility fabric") is a type of network that facilitates the monitoring and analysis of traffic flowing through another, "core" network (e.g., a production network). The reasons for deploying a visibility network are varied and can include network management and optimization, business intelligence/reporting, compliance validation, service assurance, security monitoring, and so on.

FIG. 1 depicts an example visibility network 100 according to an embodiment. As shown, visibility network 100 includes a number of taps 102 that are deployed within a core network 104. Taps 102 are configured to replicate control and data traffic that is exchanged between network elements in core network 104 and forward the replicated traffic to a packet broker 106 (note that, in addition to or in lieu of taps 102, one or more routers or switches in core network 104 can be tasked to replicate and forward data/control traffic to packet broker 106 using their respective SPAN or mirror functions). Packet broker 106 can perform various packet processing functions on the replicated traffic, such as removing protocol headers, filtering/classifying packets based on configured rules, and so on. Packet broker 106 can then forward the processed traffic to one or more analytic probes/tools 108, which can carry out various calculations and analyses on the traffic in accordance with the business goals/purposes of visibility network 100 (e.g., calculation of key performance indicators (KPIs), detection of traffic anomalies, generation of reports, etc.).

Two functions that are commonly performed by packet broker 106 in cases where core network 104 is a mobile (e.g., 3G or LTE) network that makes use of GPRS Tunneling Protocol (GTP) are (1) correlation and (2) load balancing of GTP traffic. The correlation function involves correlating GTP-C control traffic and GTP-U data traffic replicated from core network 104 on a per-GTP session basis, which allows all of the GTP-C and GTP-U traffic for a given GTP session to be associated with each other for analysis. Packet broker 106 typically performs this correlation by identifying GTP-C and GTP-U packets that include a common, unique user identifier (e.g., International Mobile Subscriber Identity (IMSI)) or user device identifier (e.g., International Mobile Equipment Identity (IMEI)) signifying that they are part of a single GTP session, and forwarding these correlated packets through a particular egress port that has been determined for the GTP session.

The load balancing function involves distributing the GTP-C and GTP-U traffic replicated from core network 104 across analytic probes/tools 108 in a relatively uniform manner, which equalizes the processing load on probes/tools 108. Packet broker 106 typically performs this load balancing by inputting the user or device identifier associated with a particular GTP session into a hash function that outputs, based on the user/device identifier, an ID of an egress port from among all of the egress ports of packet broker 106. Packet broker 106 then sends the GTP-C and GTP-U traffic for that GTP session (which has been correlated using the correlation function above) through the egress port output by the hash function (and thus, to a particular analytic probe/tool 108).

As more and more mobile users are using their smart phones, tablets, smart watches, and so on to access data content and services (e.g., email, social network applications, media streaming, voice over LTE (VoLTE), etc.), mobile network operators are increasingly moving towards implementing IP Multimedia Subsystem (IMS), which is a standardized framework and set of protocols for delivering IP multimedia services, in their network deployments. Accordingly, it would be useful for these network operators to have a visibility network like network 100 of FIG. 1 that is specifically configured to monitor and analyze IMS traffic passing through their IMS core networks. Unfortunately, designing a visibility network, and in particular a packet broker, for enabling the monitoring and analysis of IMS traffic poses a number of challenges.

First, like GTP traffic, IMS traffic includes control (i.e., Session Initiation Protocol (SIP)) traffic and data (i.e., Real-time Transport Protocol (RTP)) traffic that ideally should be correlated on a per-session basis in order to facilitate analysis of the traffic. However, unlike GTP, an IMS session (which may be, e.g., a VoLTE call or some other IP multimedia session) can involve multiple users, and can be identified by multiple different "call-IDs" as the session traffic passes through different IMS network interfaces. Further, each IMS user in an IMS session can have multiple public identities that are shared with other users. Taken together, this means that there is no unique user, device, or session identifier in IMS (as there is in GTP) that can be used to easily correlate SIP and RTP traffic for a given IMS session to each other.

Second, as mentioned above, GTP traffic is typically load balanced across analytic probes/tools by computing a hash function that takes as input a unique user/device identifier associated with a given GTP session and outputs an egress port ID for that session. However, since there no unique user, device, or session identifier in IMS, there is currently no way to load balance IMS traffic on a per-session basis across analytic probes/tools in the same manner as GTP traffic.

SUMMARY

Techniques for correlating and load balancing IMS traffic in a visibility network are provided. According to one set of embodiments, a packet broker of the visibility network can receive IMS traffic replicated from an IMS core network and identify control/data packets in the IMS traffic that are part of the same IMS session based on FROM and TO user identities included in the packets. The packet broker can then generate a unique session identifier for the IMS session and add the generated session identifier to the packets. In certain embodiments, the packet broker can further provide the generated session identifier as input to a load balancing algorithm or rule set. The load balancing algorithm or rule set can output an egress port of the packet broker through which the control/data packets should be forwarded based on the session identifier.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

The present disclosure provides techniques that can be implemented in a packet broker of a visibility network for enabling correlation and load balancing of IMS traffic replicated from a core network. With respect to correlation, the packet broker can identify IMS control (i.e., SIP) traffic and IMS data (i.e., RTP) traffic that relate to the same IMS session based on FROM and TO headers in the traffic. These FROM and TO headers typically specify public identities of users at the endpoints of the session. The packet broker can then generate a unique session identifier (ID) for the SIP/RTP packets that belong to the same IMS session and add this generated session ID to the packets, thereby correlating these packets together for analysis purposes. To account for scenarios where the FROM or TO headers correspond to users with multiple different public identities, the packet broker can keep track of mappings between user public identities and user private identities and resolve a public identity in the FROM or TO header to a corresponding private identity as part of the correlation process.

With respect to load balancing, the packet broker can use the unique session IDs that it generates as an input key for a load balancing algorithm or rule set, such that the IMS traffic replicated from the core network is distributed among analytic probe/tools on a per-IMS session basis. The specific load balancing algorithm/rule set that is used can vary depending on the implementation. For example, in one set of embodiments, the packet broker can use a round-robin (or other similar) algorithm that causes a relative uniform number of IMS sessions to be assigned to each analytic probe/tool. In another set of embodiments, the packet broker can leverage a load balancing rule table that maps IMS sessions to particular egress ports (and thus to particular probes/tools) based on user-defined traffic rules.

The foregoing and other aspects of the present disclosure are described in further detail below.

2. System Architecture and High-Level Workflow

Figure 1:
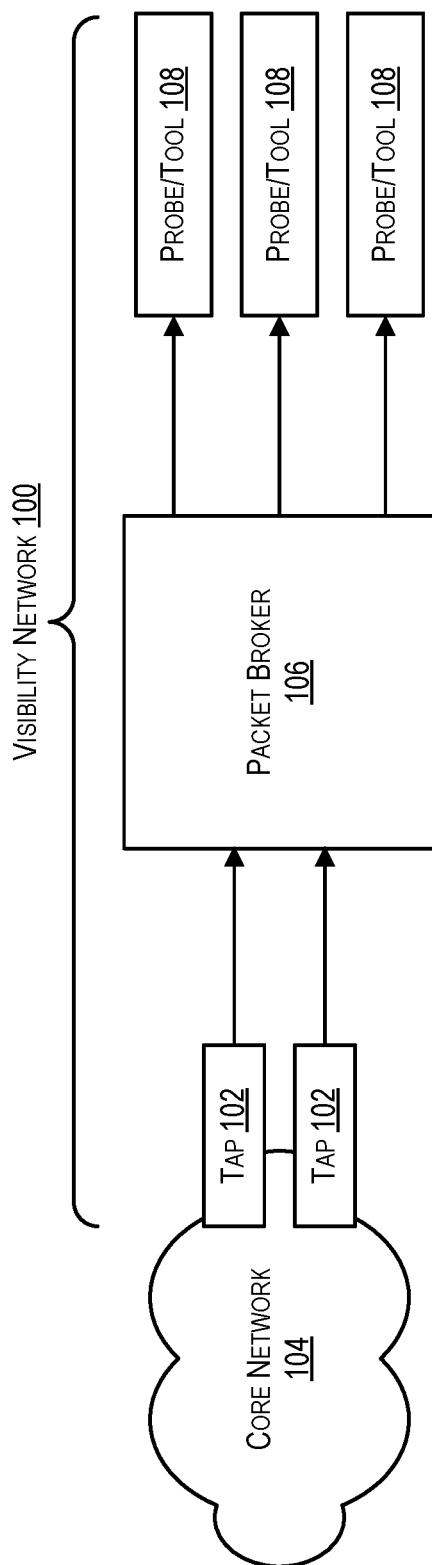
FIG. 1 depicts an example visibility network.
Figure 2:
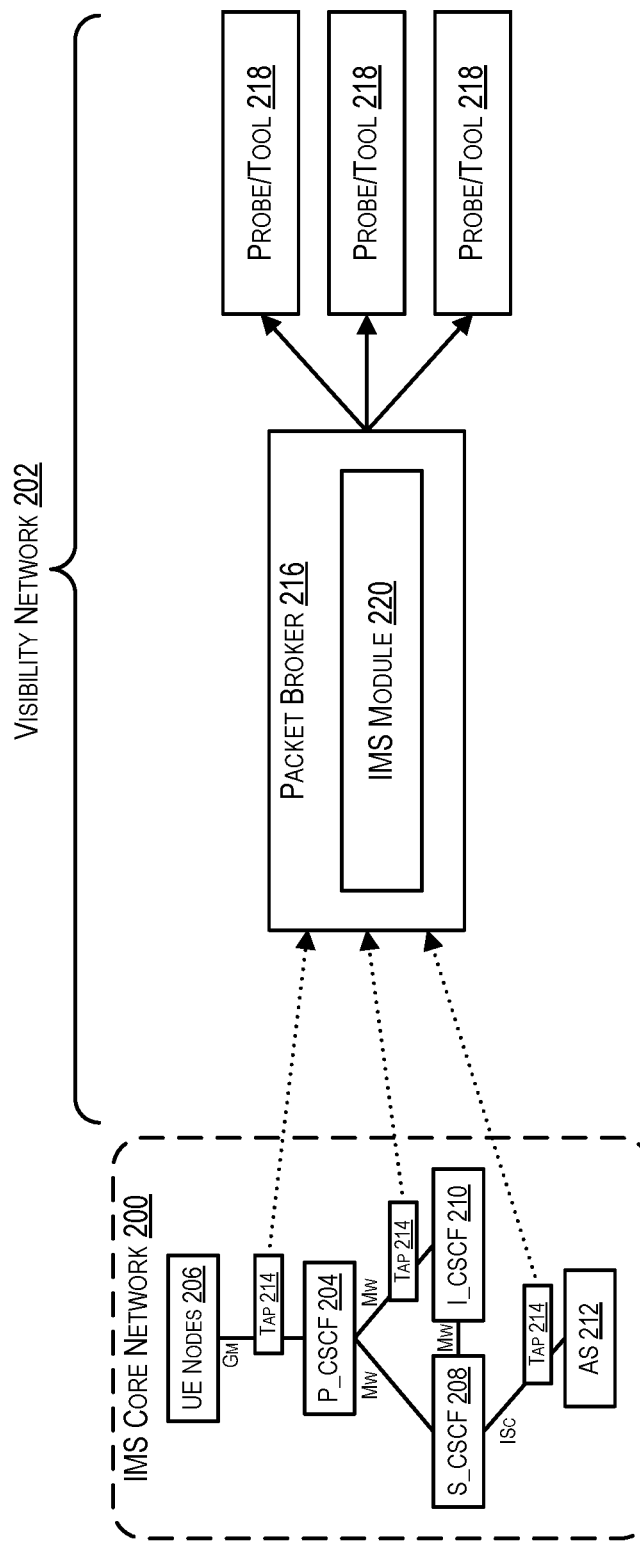
FIG. 2 depicts an IMS core network and a visibility network that implements the techniques of the present disclosure according to an embodiment.

FIG. 2 is a simplified block diagram of an example IMS core network 200 and a corresponding visibility network 202 that implements the techniques of the present disclosure according to an embodiment. As shown, IMS core network 200 includes a P_CSCF (Proxy Call State Call Function) element 204 that is communicatively coupled with user equipment nodes (e.g., end-user mobile devices) 206 via a "Gm" interface. P-CSCF 204 acts as the first point of contact for UE nodes 206 with respect to IMS core network 200. P_CSCF 204 is also communicatively coupled with an S_CSCF (Serving Call State Control Function) element 208 and an I_CSCF (Interrogating Call State Control Function) element 210 via respective "Mw" interfaces. S_CSCF 208 is, in turn, connected with I_CSCF 210 via another Mw interface and with one or more application server(s) (AS) 212 via an "ISc" interface. Application server(s) 212 are configured to host and execute IMS-specific services that are provided to UE nodes 206.

Visibility network 202 includes a number of taps 214 that are deployed in IMS core network 200 and are configured to replicate IMS control (i.e., SIP) and IMS data (i.e., RTP) traffic exchanged in network 200 to a packet broker 216. In the example of FIG. 2, there is one tap deployed on each of the following IMS network interfaces: (1) the Gm interface between UE nodes 206 and P_CSCF 204; (2) the Mw interface between P_CSCF 204 and I-CSCF 210; and and (3) the ISc interface between S_CSCF 208 and AS 212.

Upon receiving the replicated IMS traffic via taps 214, packet broker 216 can perform various types of packet processing functions on the traffic (as configured/assigned by an operator of visibility network 202) and can forward the processed traffic to one or more analytic probes/tools 218 for analysis. In one embodiment, packet broker 216 can be implemented solely in hardware, such as in the form of a network switch or router that relies on ASIC or FPGA-based packet processors to execute its assigned packet processing functions based on rules that are programmed into hardware memory tables (e.g., CAM tables) resident on the packet processors and/or line cards of the device. In another embodiment, packet broker 216 can be implemented solely in software that runs on, e.g., one or more general purpose physical or virtual computer systems. In yet another embodiment, packet broker 216 can be implemented using a combination of hardware and software, such as a combination of a hardware-based basic packet broker and a software-based "session director" cluster as described in co-owned U.S. patent application Ser. No. 15/205,889, entitled "Software-based Packet Broker," the entire contents of which are incorporated herein by reference in its entirety for all purposes.

As noted in the Background section, conventional packet brokers are capable of correlating and load balancing GTP traffic that is replicated from a mobile core network based on user (e.g., IMSI) or device (e.g., IMEI) identifiers that are included in the GTP packets and are uniquely associated with each GTP session. However, unlike GTP traffic, IMS traffic does not include such unique, per-session user or device identifiers. There are a number of reasons for this—for example, an IMS session (e.g., a VoLTE call) can comprise multiple users, who may or may not be using IMS UEs. Further, the packets for a single IMS session may be identified by different call-IDs, depending on where those packets are tapped from in the IMS core network (e.g., one packet that is tapped from the Gm interface may include a call-ID of "A" while another packet in the same IMS session that is tapped from the ISc interface may include a call ID of "B"). Yet further, a given user in an IMS session may be identified by multiple different public identities to other users. Because of these factors, it is not possible for conventional packet brokers to correlate and load balance IMS traffic replicated from an IMS core network (such as network 200 of FIG. 2) in the same way as GTP traffic.

Figure 3:
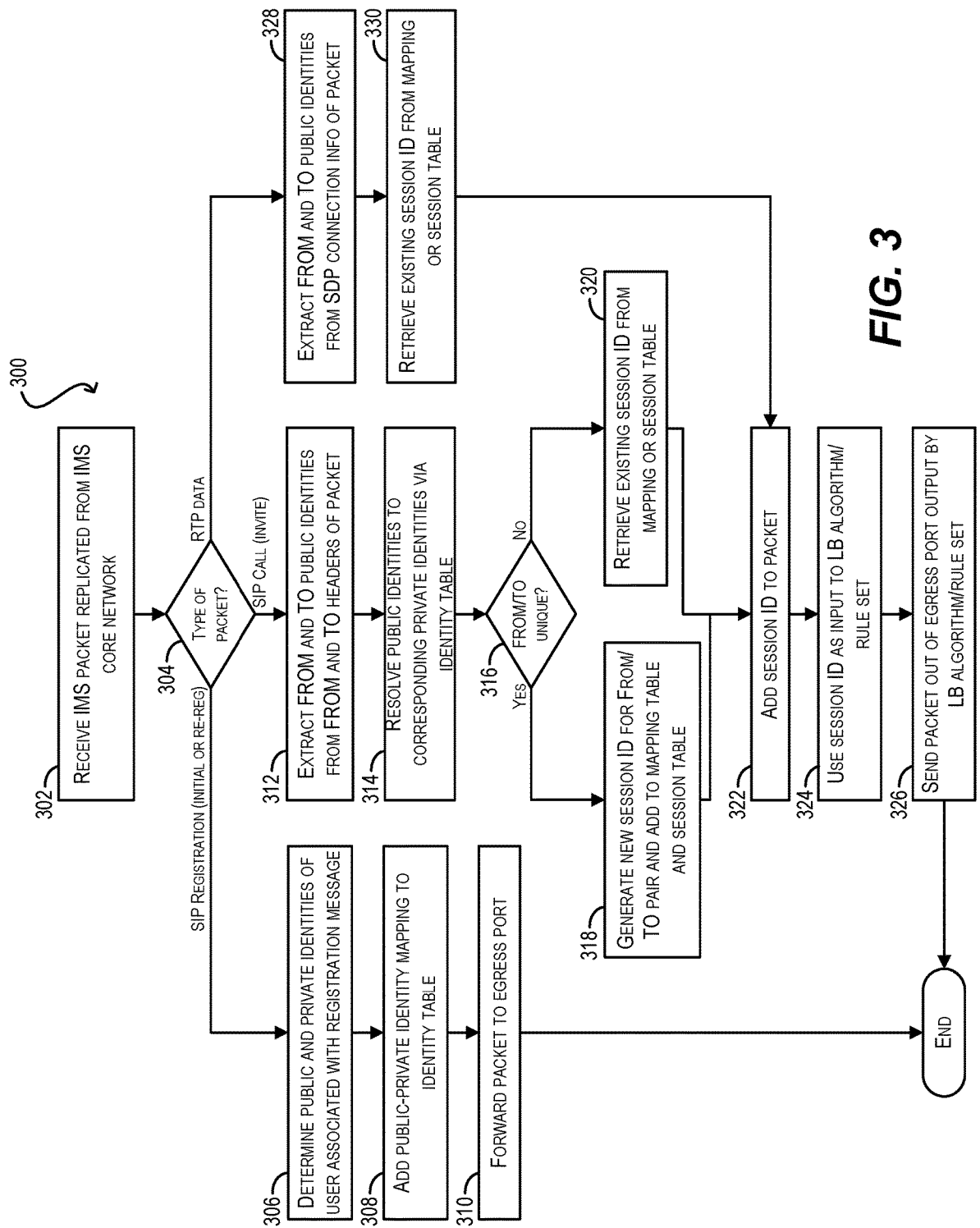
FIG. 3 depicts a high-level IMS correlation and load balancing workflow according to an embodiment.

To address this problem, packet broker 216 of FIG. 2 is enhanced to include a novel IMS correlation and load balancing module 220 (referred to herein simply as "IMS module" 220). Generally speaking, IMS module 220 can carry out a process that enables packet broker 216 correctly correlate and load balance IMS control and data traffic received from IMS core network 200 on a per-IMS session basis, despite the lack unique user or device identifiers in the IMS traffic. FIG. 3 depicts a high-level workflow 300 of this process according to an embodiment.

Starting with block 302, IMS module 220 can receive an IMS control (SIP) or data (RTP) packet that has been replicated from IMS core network 200 via a tap 214. At block 304, IMS module 220 can determine whether the packet is a SIP registration message, a SIP call message, or an RTP packet. For purposes of this disclosure, a "SIP registration" message refers to any request or response message that pertains to IMS session registration under the SIP protocol. Examples of SIP registration request messages include initial registration, re-registration, and de-registration. Further, a "SIP call" message refers to any request or response message that pertains to call state management under the SIP protocol. Examples of SIP call request messages include INVITE, ACK, BYE, CANCEL, OPTIONS, PRACK, SUBSCRIBE, NOTIFY, PUBLISH, INFO, REFER, and UPDATE.

If the packet is a SIP registration message (and in particular, an initial registration or re-registration), IMS module 220 can determine private and public identities of the user associated with the registration message (block 306) and add a mapping between the private and public identities to an identity table maintained by module 220 (if such a mapping does not already exist there) (block 308). IMS module 220 can then forward the packet to an appropriate egress port towards analytic probes/tools 218 (block 310) and workflow 300 can end. The purpose of blocks 306 and 308 is to keep track of the private-public identity mappings for all IMS session users so that this information can be used to identify new IMS sessions (based on FROM and TO headers) in the call message branch of workflow 300. An example of this identity table is shown below, which includes a private identity field, a public identity field, and a status field (indicating the status of the registration).

TABLE 1

Identity Table

| Private Identity | Public Identity | Status |
| --- | --- | --- |
| 123456789123456 | 9886001021, +9886001021 | Active |
| 111111111111111 | 9866001020, +9886001020 | Active |
| 222222222222222 | 9886001022, +98860010212 | Active |

It should be noted that the processing performed in the "registration message" branch of workflow 300 will differ if the received SIP registration message is a de-registration; this de-registration processing is described in section (3) below.

Returning to block 304, if IMS module 220 determines that the packet is a SIP call message (and in particular, an INVITE message), module 220 can extract public identities of the users at the endpoints of the session/call (i.e., the FROM and TO users identified in the FROM and TO headers of the packet) (block 312) and can resolve these public identities into corresponding private identities using the identity table (block 314). IMS module 220 can then determine whether the FROM and TO pair is unique (i.e., hasn't been seen before) (block 316). If so, IMS module 220 can conclude that a new IMS session has been initiated, generate a new session ID for the session, and add the session ID, FROM public identity, TO public identity, and a call-ID included in the packet to a mapping table maintained by module 220 (block 318). IMS module 220 can also add the newly-generated session ID, along with the FROM identity, TO identity, and a session status, to a separate session table. By updating these tables, IMS module 220 can track the IMS session and the newly-generated ID for the session. Examples of the mapping and session tables are shown below.

TABLE 2

Mapping Table

| FROM | TO | CALL-ID | Session ID |
| --- | --- | --- | --- |
| +9886001021 | +9886001020 | 111111111_22222222@1.1.1.1.1, 333333333_44444444@2.2.2.2.2, 555555555_66666666@3.3.3.3 | asdfghjkl123456qwert09876hcxzsdn |
| 9886001022 | +98860010212 | 22222222_33333333@4.4.4.4, 11111111_55555555@5.5.5.5, 77777777_11111111@6.6.6.6 | kelrtgcvbq23451gtfcviu678923koetr |
| 9886001020 | 9886001021 | | loebnhwtcv2dl317jg390jv290bmh3vh |

TABLE 3

Session Table

| FROM | TO | Session ID | Status |
|---|---|---|---|
| +9886001021 | +9886001020 | asdfghjkl123456qwert09876hcxzsdn | Active |
| 9886001022 | +98860010212 | kelrtgcvbq23451gtfcvju678923koetr | Active |
| 9886001020 | 9886001021 | loebnhwtcv2d1317jg390jv290bmh3vh | Init |

Otherwise, if the FROM and TO pair is not unique (meaning that it already exists in the mapping and/or session table), IMS module 220 can simply retrieve an existing session ID for the pair from the mapping/session table (block 320).

At block 322, IMS module 220 can add the generated or retrieved session ID to the packet, thereby correlating it with other packets including the same session ID. Further, at block 324, IMS module 220 can use the session ID as an input key/parameter to a load balancing algorithm or rule set, which can output an egress port ID based on the session ID. IMS module 220 can then send the packet to the egress port identified by the load balancing algorithm/rule set (and thus to a particular analytic probe/tool 218) (block 326) and workflow 300 can end.

It should be noted that the processing performed in this "call message" branch of the workflow will differ if the received SIP call message is not an INVITE; this alternate processing is described in section (4) below.

Finally, if IMS module 220 determines that the packet is an RTP packet at block 304, module 220 can extract FROM and TO identities from the SDP (Session Description Protocol) connection information section of the packet (block 328) and look up the corresponding session ID for the FROM/TO pair from the mapping and/or session table (block 330). The remainder of this branch can then proceed per blocks 322-326 (i.e., add session ID to packet; load balance based on the session ID; send packet out of egress port identified by load balancing algorithm/rule set) and workflow 300 can end.

With the general approach shown in FIG. 3, IMS module 220 can advantageously correlate the IMS control and data traffic replicated from IMS core network 200 via the generated session IDs, and can further leverage these session IDs to load balance the traffic on a per-session basis across analytic probes/tools 218. Additional details regarding the processing performed by IMS module 220 in the registration and call message branches of workflow 300 are provided in the sections that follow.

It should be appreciated that FIGS. 2 and 3 are illustrative and not intended to limit embodiments of the present disclosure. For example, the various entities shown in FIG. 2 may be arranged according to different configurations/arrangements and/or may include functions or subcomponents that are not specifically described. Further, although workflow 300 describes the creation and maintenance of three distinct tables (identity, mapping, and session tables), the information held in these tables can be collapsed into fewer tables or expanded into more tables depending on the implementation. One of ordinary skill in the art will recognize other variations, modifications, and alternatives.

3. SIP Registration Message Workflow

Figure 4A:
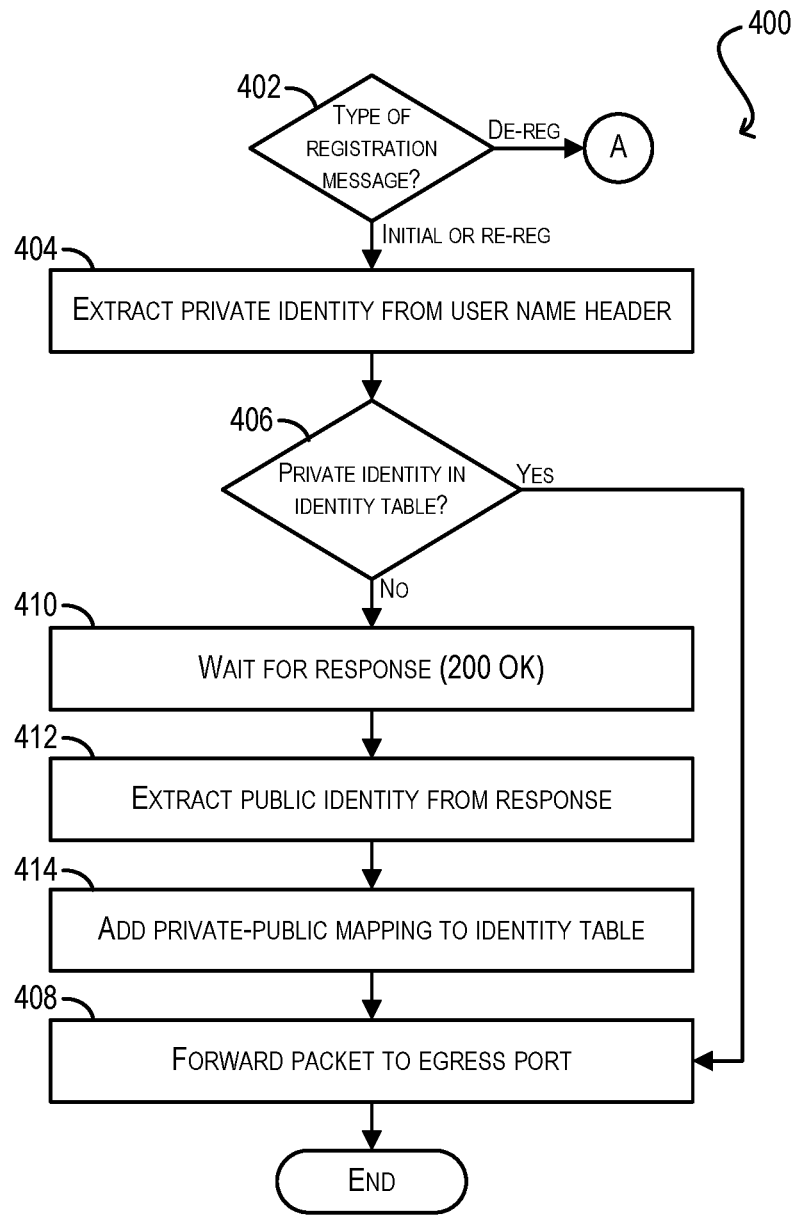
FIGS. 4A and 4B depict a detailed SIP registration message workflow according to an embodiment.
Figure 4B:
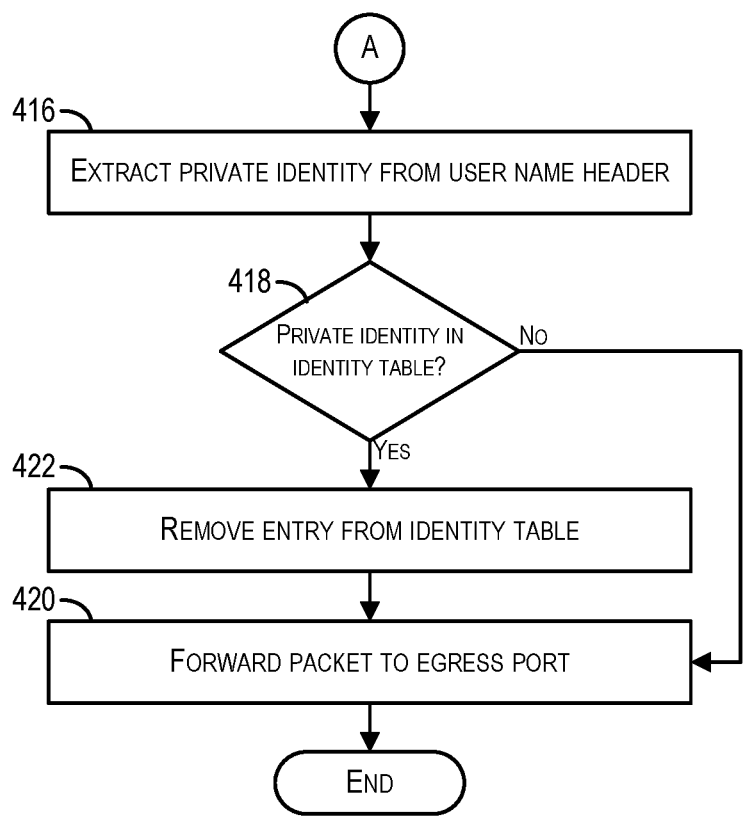

FIGS. 4A and 4B depict a workflow 400 that provides additional details regarding the processing performed by IMS module 220 in the SIP registration message branch of FIG. 3 according to an embodiment. As mentioned previously, the main purpose of this registration message branch is to update the identity table with private-public identities mappings, which can then be used to identify unique FROM and TO users (and thus, new IMS sessions) in the call message branch. Workflow 400 assumes that the received packet has been determined to be a SIP registration message per block 304 of FIG. 3.

Starting with block 402 of FIG. 4A, IMS module 220 can check whether the packet is an initial registration/re-registration or a de-registration message. If the packet is an initial registration or re-registration, module 220 can extract a private identity from a user name header of the packet (block 404) and check whether the private identity exists in the identity table (block 406). If the private identity does exist in the identity table, there is no need to update the table; thus, IMS module 220 can simply forward the packet to an egress port (block 408) and workflow 400 can end.

However, if the private identity does not exist in the identity table, IMS module 220 can wait for a response message (i.e., 200 OK) to the initial registration/re-registration message (block 410) and, upon receiving the response, can extract one or more public identities associated with the private identity from a "P-Associated URI" field of the response message (block 412). IMS module 220 can then add a mapping between the private identity and the public identity (or identities) to the identity table (block 414), forward the packet to an egress port (block 408), terminate the workflow.

Returning to block 402, if IMS module 220 determines that the packet is a de-registration, the workflow can proceed to FIG. 4B. At blocks 416 and 418 of FIG. 4B, IMS module 220 can extract a private identity from a user name header of the packet and check whether the private identity exists in the identity table. If the private identity does not exist in the identity table, IMS module 220 can forward the packet to an egress port (block 420) and workflow 400 can end.

However, if the private identity does exist in the identity table, IMS module 220 can remove the entry in the identity table for the private identity (block 422). IMS module 220 can then forward the packet to an egress port per block 420 and workflow 400 can end.

4. SIP Call Message Workflow

Figure 5A:
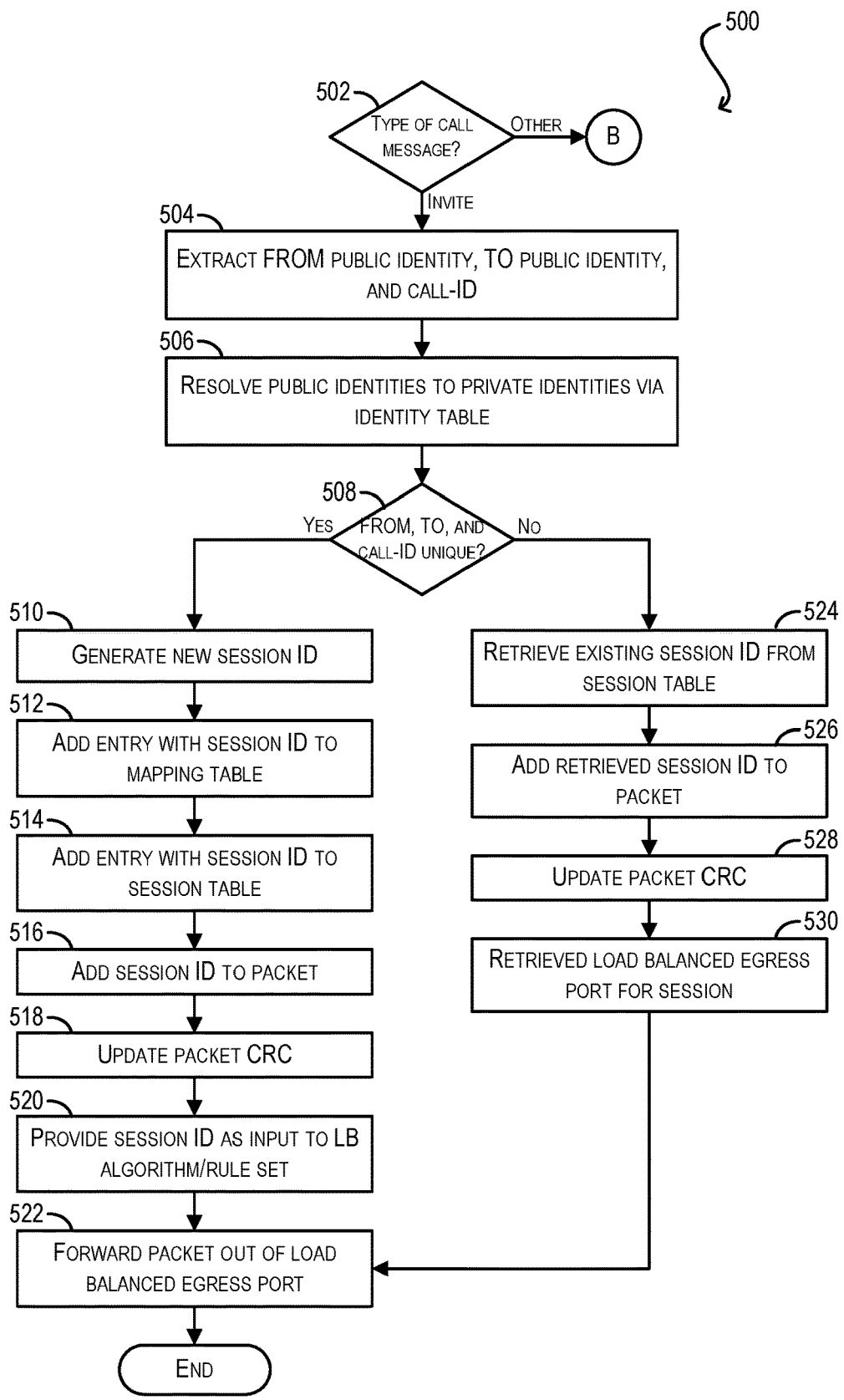
FIGS. 5A, 5B, and 5C depict a detailed SIP call message workflow according to an embodiment.
Figure 5B:
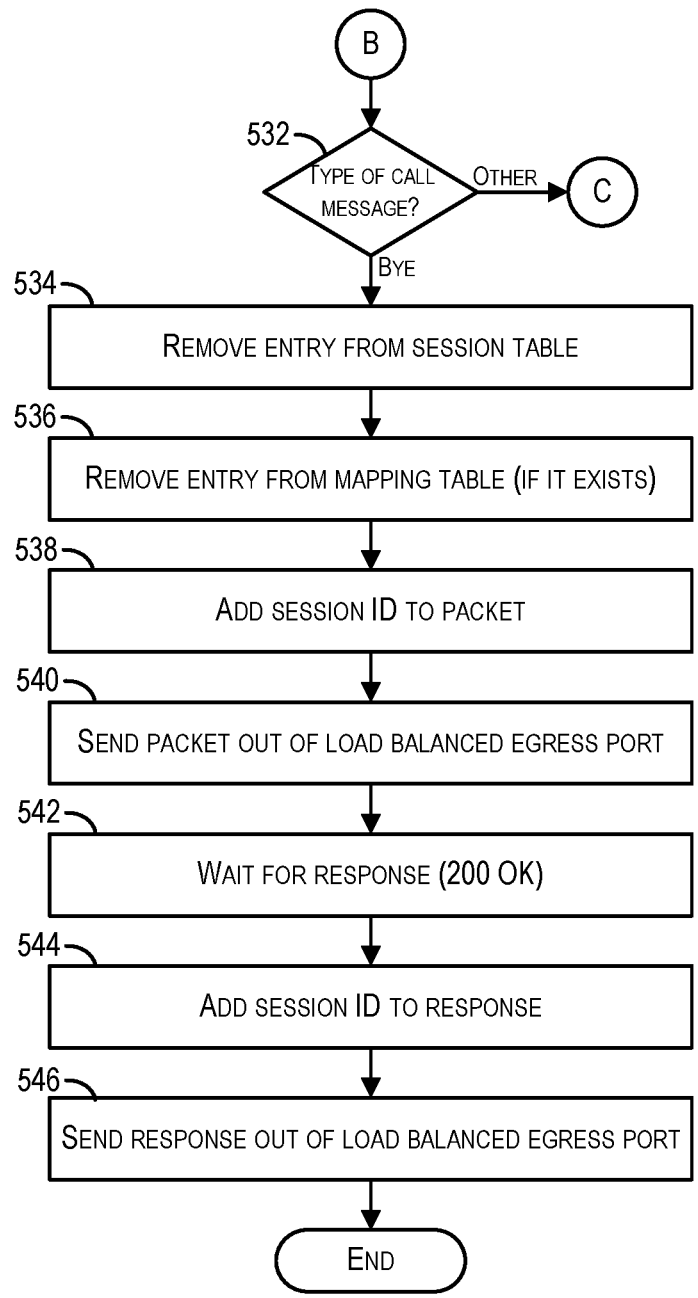
Figure 5C:
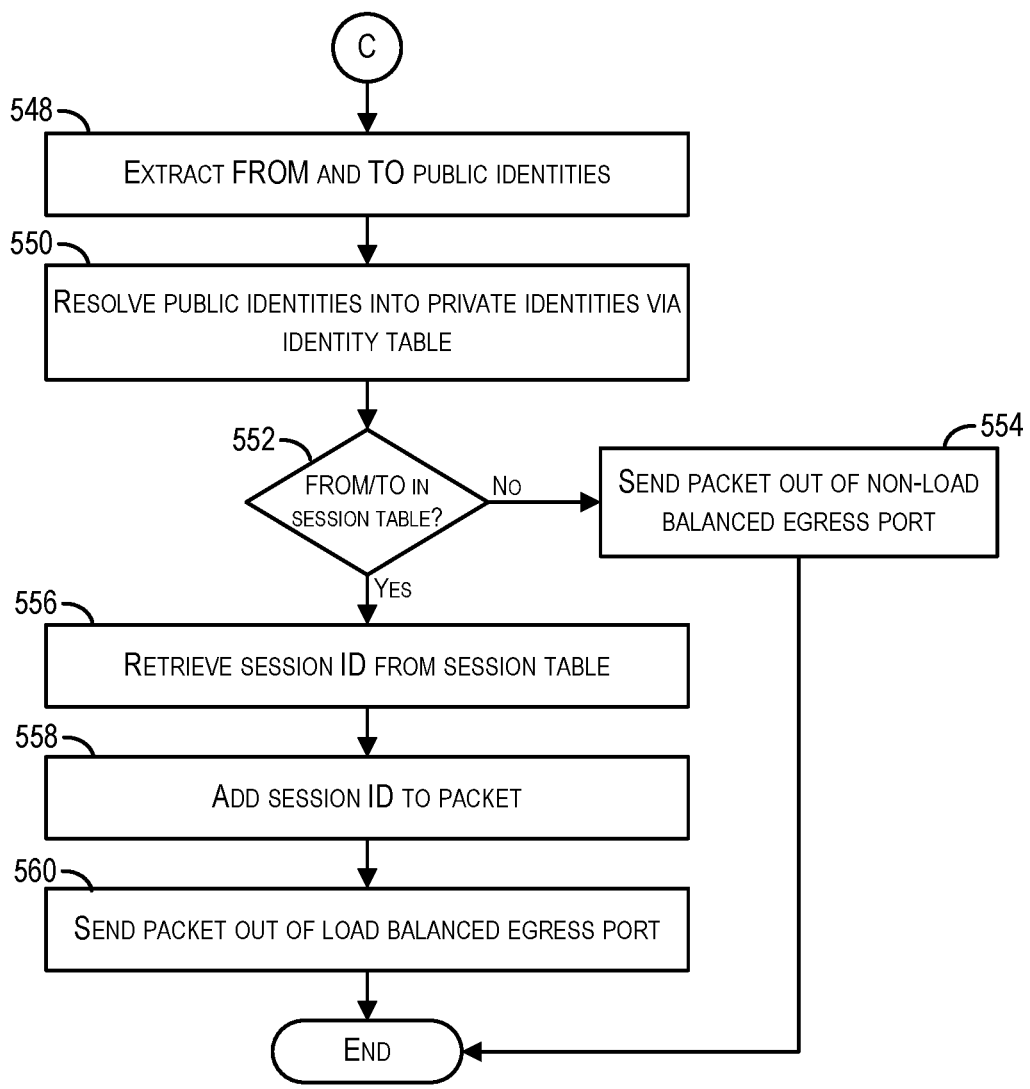

FIGS. 5A, 5B, and 5C depict a workflow 500 that provides additional details regarding the processing performed by IMS module 220 in the SIP call message branch of FIG. 3 according to an embodiment. As mentioned previously, the main purpose of this call message branch is to classify call messages based on the FROM/TO user identities included in the FROM/TO headers of the packets and to generate a unique session ID for a given call message if includes a unique FROM/TO pair that identifies a new IMS session. This unique session ID, along with other information such as the FROM and TO identities, can be added to a mapping table and a session table. The call message can then be updated to include the session ID and can be load balanced based on this session ID to an appropriate egress port of the packet broker. Workflow 500 assumes that the received packet has been determined to be a SIP call message per block 304 of FIG. 3.

Starting with block 502 of FIG. 5A, IMS module 220 can check whether the packet is an INVITE call message or a different type of call message. If it is an INVITE message, IMS module 220 can extract a FROM public identity, a TO public identity, and a call-ID from the message (block 504). IMS module 220 will typically extract the FROM and TO public identities from the FROM and TO headers of the packet respectively. However, in some cases, the FROM header may identify "Anonymous" (or an invalid identity having special characters) instead of a valid public identity. In these scenarios, IMS 220 module can first check for a "P-Asserted Identity" (PAI) in the packet and, if the PAI exists, use this PAI as the FROM public identity. If the PAI does not exist, IMS module 220 can check for a "P-Preferred Identity" (PPI) and use this PPI as the FROM public identity.

Once IMS module 220 has extracted the FROM public identity, TO public identity, and call-ID from the packet, module 220 can resolve the FROM and TO public identities into corresponding private identities based on the identity table (block 506). IMS module 220 can then check whether the FROM identity, TO identity, and call-ID are unique (i.e., not in the mapping table) (block 508). If this combination is unique, IMS module 220 can generate a new session ID for the combination (block 510), add an entry with the newly-generated session ID to the mapping table (block 512), and add an entry with the newly-generated session ID to the session table (block 514). In this way, IMS module 220 can track the IMS session and its associated parameters (e.g., session ID, FROM, TO, call-ID(s), status).

IMS module 220 can then add the session ID to the packet (block 516), update the packet's CRC value (block 518), and provide the session ID as input to a load balancing algorithm/rule set (which outputs an egress port ID) (block 520). As part of block 520, IMS module 220 can add the egress port ID to a load balancer table that maps the egress port ID to the session ID. Finally, at block 522, IMS module 220 can forward the packet out of the determined egress port towards a particular analytic probe/tool 218.

On the other hand, if IMS module 220 determines that the FROM identity, TO identity, and call-ID are not unique at block 508, module 220 can retrieve an existing session ID for the FROM/TO pair from the session table (block 524). IMS module 220 can then add the retrieved session ID to the packet (block 526), update the packet's CRC value (block 528), retrieve the load balanced egress port for the session from the load balancer table described previously (block 530), and forward the packet out of the load balanced egress port (block 522).

Returning now to block 502, if IMS module 220 determines that the call message is not an INVITE message, workflow 500 can proceed to FIG. 5B. At block 532 of FIG. 5B, IMS module 220 can check whether the call message is a BYE message or a different type of call message. If it is a BYE message, IMS module 220 can remove an entry in the session table correspond to the FROM/TO pair of the message (block 534), remove an entry in the mapping table corresponding to the FROM/TO pair of the message (if it exists (block 536), update the message with the session ID (block 538), and send the updated message out of the load balanced egress port for the session (block 540). IMS module 220 can further want for a response (200 OK) to the BYE message (block 542) and, upon receiving the response, can add the session ID to the response (block 544) and forward the response to the load balanced egress port (block 546).

However, if IMS module 220 determines that the call message is not a BYE message at block 532, workflow 500 can proceed to FIG. 5C. At blocks 548-552 of FIG. 5C, IMS module 220 can extract the FROM and TO public identities from the packet, resolve the public identities into private identities per the identity table, and check whether the FROM and TO identities exist in the session table. If not, IMS module 220 can forward the packet to a non-load balanced port of the packet broker (block 554).

On the other hand, if the FROM/TO identities do exist in the session table, IMS module 220 can retrieve the corresponding session ID from the session table (block 556) and add it to the packet (block 558). Finally, IMS module 220 can forward the packet to the load balanced egress port for the session (block 560).

Although not specifically shown in FIGS. 5A-5C, as part of workflow 500 IMS module 220 can also update the "status" field of the session table based on the types of call messages that are received. The rules for updating this status field can include the following according to an embodiment:
  Upon receiving an INVITE, update session status to "Init"
  Upon receiving a 200 OK for an INVITE, update session status to "Established"
  For any 1xx or 3xx response, the session status will not be changed
  For any 4xx, 5xx, or 6xx responses, remove the session table entry
  Upon receiving an ACK, update session status to "Active"
  Upon receiving a 200 OK for a BYE, remove the session table entry 5. Load Balancing As mentioned above, the session ID that is generated for a given IMS session can be used as an input key to a load balancing algorithm or rule set, which in turn can generate an egress port ID based on the session ID. IMS module 220 can then forward all SIP and RTP traffic for the IMS session to this egress port (referred to as a "load balanced egress port").

In one set of embodiments, IMS module 220 can make use of a round robin (or other similar) algorithm that is configured to distributed IMS sessions across analytic probes/tools 218 in a relatively uniform manner. In other embodiments, IMS module 220 can maintain a load balancing rule table that includes user-defined traffic rules for assigning certain types of IMS sessions to certain "logical ports." Each of these logical ports can in turn be assigned to one or more egress ports, which are connected to particular analytic probes/tools. The following is load balancer rule table with example user-defined traffic rules according to an embodiment:

TABLE 4

Load Balancer Rule Table

| Traffic Rule | Logical Port | Egress port | Session ID |
|---|---|---|---|
| All IMS sessions involving a VoLTE to VoLTE call in which only two parties are involved | IMS VoLTE call port | 1/1 | 10, 20, 30 |
| All IMS sessions involving two UEs where at least one UE is IMS and the other UE is either IMS or non IMS UE | IMS VoLTE conference port | 1/2 | 100, 110, 120 |
| All IMS sessions | | | |

TABLE 4-continued

Load Balancer Rule Table

| Traffic Rule | Logical Port | Egress port | Session ID |
|---|---|---|---|
| involving conference calls | | | |
| All IMS sessions where any UE which is MT IMS callee and MO is non IMS UE | IMS VoLTE call default port | 1/3 | 200, 210, |
| All IMS sessions where any UE which is MO IMS caller and callee is a non IMS UE | | | |
| All IMS SM sessions where both MO and MT UEs are IMS users | IMS VoLTE SM port | 1/4 | 15, 25, 35 |
| All IMS SM sessions where MO or MT UEs are IMS users | IMS VoLTE SM default Port | 1/5 | 115, 125 |

As shown above, each rule in the load balancer rule table above is associated with a logical port and a physical egress port of the packet broker. When IMS module 220 identifies a new IMS session and generates a session ID for the session (per workflow 400 of FIG. 4), module 220 check the load balancer rule table to determine which traffic rule applies to the session. IMS module 220 can then add the session ID to the matching rule entry, which will cause module 22 to forward all SIP and RTP traffic for that session to the egress port(s) identified in the entry. Further, when an IMS session is terminated, module 220 can remove the session ID for the terminated session from the table.

6. Example Network Device

Figure 6:
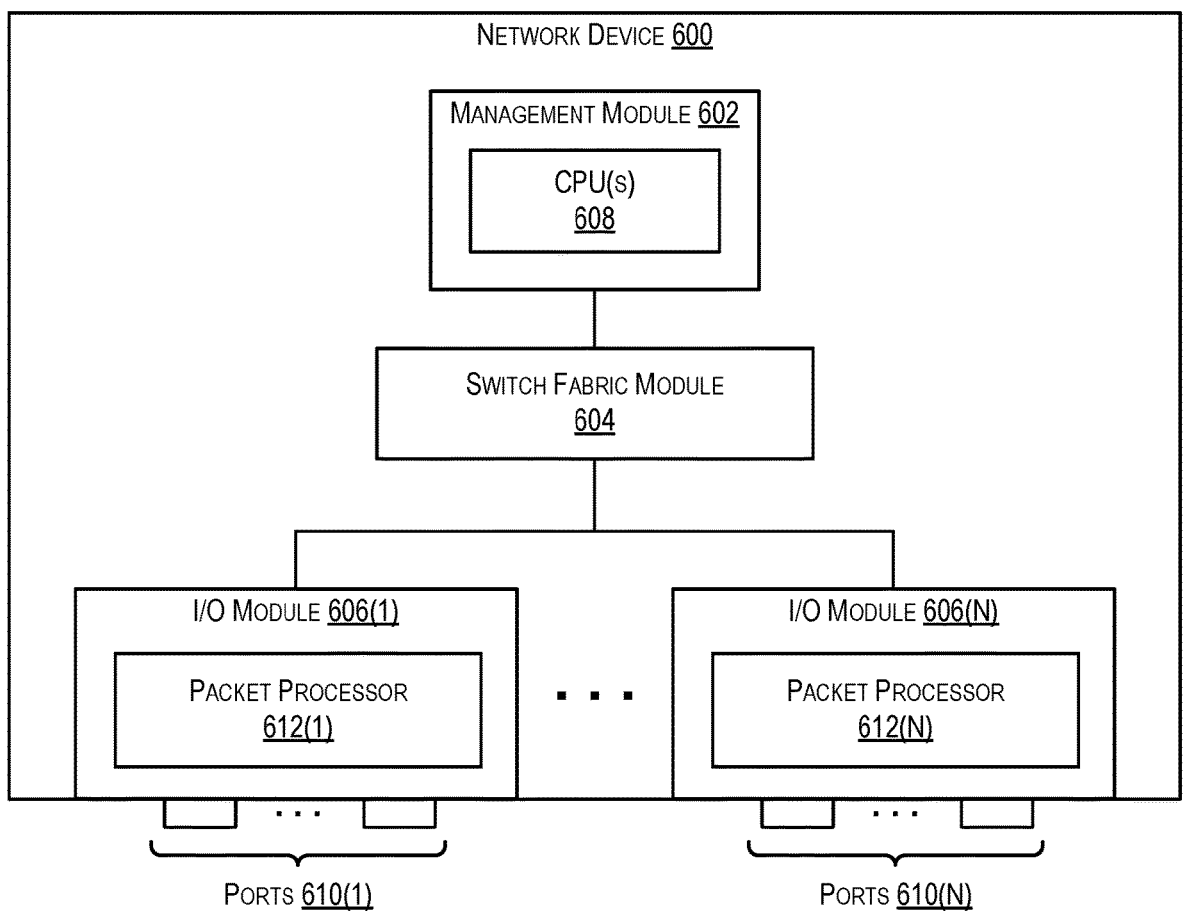
FIG. 6 depicts an example network device according to an embodiment.

FIG. 6 depicts an example network device (e.g., switch and/or router) 600 in which certain embodiments of the present disclosure may be implemented. For example, in one set of embodiments, network device 600 may be used to implement packet broker 216 of FIG. 2 (either wholly or in part).

As shown, network device 600 includes a management module 602, a switch fabric module 604, and a number of I/O modules 606(1)-606(N). Management module 602 includes one or more management CPUs 608 for managing/controlling the operation of the device. Each management CPU 608 can be a general purpose processor, such as a PowerPC, Intel, AMD, or ARM-based processor, that operates under the control of software stored in an associated memory (not shown).

Switch fabric module 604 and I/O modules 606(1)-606(N) collectively represent the data, or forwarding, plane of network device 600. Switch fabric module 604 is configured to interconnect the various other modules of network device 600. Each I/O module 606(1)-606(N) can include one or more input/output ports 610(1)-610(N) that are used by network device 600 to send and receive data packets. Each I/O module 606(1)-606(N) can also include a packet processor 612(1)-612(N). Packet processor 612(1)-612(N) is a hardware processing component (e.g., an FPGA or ASIC) that can make wire speed decisions on how to handle incoming or outgoing data packets.

It should be appreciated that network device 600 is illustrative and many other configurations having more or fewer components than network device 600 are possible.

7. Example Computer System

Figure 7:
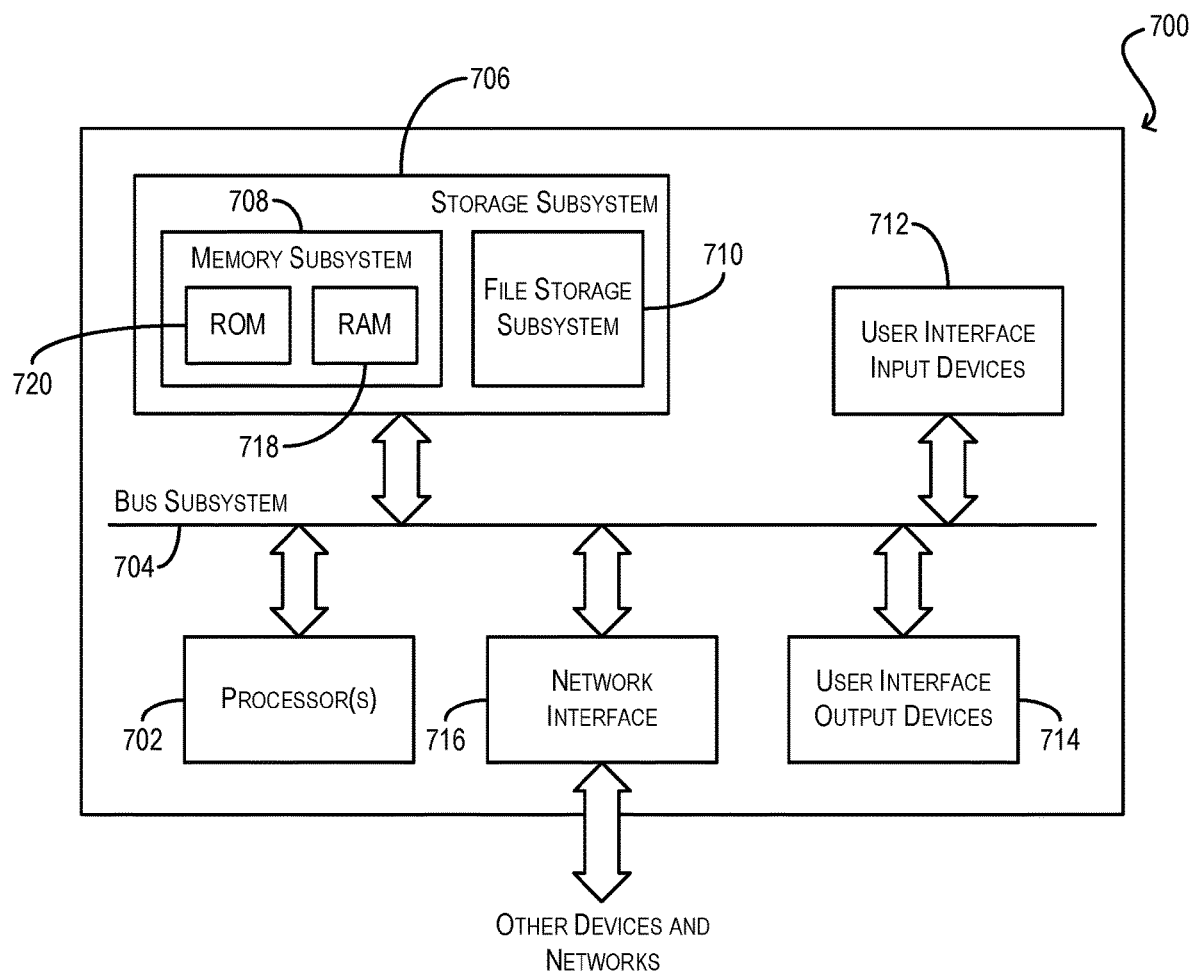
FIG. 7 depicts an example computer system according to an embodiment.

FIG. 7 depicts an example computer system 700 in which certain embodiments of the present disclosure may be implemented. For example, in one set of embodiments, computer system 700 may be used to implement packet broker 216 of FIG. 2 (either wholly or in part).

As shown in FIG. 7, computer system 700 includes one or more processors 702 that communicate with a number of peripheral devices via a bus subsystem 704. These peripheral devices include a storage subsystem 706 (comprising a memory subsystem 708 and a file storage subsystem 710), user interface input devices 712, user interface output devices 714, and a network interface subsystem 716.

Bus subsystem 704 can provide a mechanism for letting the various components and subsystems of computer system 700 communicate with each other as intended. Although bus subsystem 704 is shown schematically as a single bus, alternative embodiments of the bus subsystem can utilize multiple buses.

Network interface subsystem 716 can serve as an interface for communicating data between computer system 700 and other computing devices or networks. Embodiments of network interface subsystem 716 can include wired (e.g., coaxial, twisted pair, or fiber optic Ethernet) and/or wireless (e.g., Wi-Fi, cellular, Bluetooth, etc.) interfaces.

User interface input devices 712 can include a keyboard, pointing devices (e.g., mouse, trackball, touchpad, etc.), a scanner, a barcode scanner, a touch-screen incorporated into a display, audio input devices (e.g., voice recognition systems, microphones, etc.), and other types of input devices. In general, use of the term "input device" is intended to include all possible types of devices and mechanisms for inputting information into computer system 700.

User interface output devices 714 can include a display subsystem, a printer, a fax machine, or non-visual displays such as audio output devices, etc. The display subsystem can be a cathode ray tube (CRT), a flat-panel device such as a liquid crystal display (LCD), or a projection device. In general, use of the term "output device" is intended to include all possible types of devices and mechanisms for outputting information from computer system 700.

Storage subsystem 706 includes a memory subsystem 708 and a file/disk storage subsystem 710. Subsystems 708 and 710 represent non-transitory computer-readable storage media that can store program code and/or data that provide the functionality of various embodiments described herein.

Memory subsystem 708 includes a number of memories including a main random access memory (RAM) 718 for storage of instructions and data during program execution and a read-only memory (ROM) 720 in which fixed instructions are stored. File storage subsystem 710 can provide persistent (i.e., non-volatile) storage for program and data files and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 700 is illustrative and many other configurations having more or fewer components than computer system 700 are possible.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, although certain embodiments have been described with respect to particular process flows and steps, it should be apparent to those skilled in the art that the scope of the present invention is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A method comprising:
    receiving, by a packet broker of a visibility network, a first Internet Protocol (IP) Multimedia Subsystem (IMS) packet replicated from an IMS core network;
    adding, by the packet broker, a mapping between a public identity and a private identity associated with the first IMS packet to an identity table;
    receiving, by the packet broker, a second IMS packet replicated from the IMS core network;
    identifying, by the packet broker, that the second IMS packet belongs to a new IMS session, wherein the identifying comprises:
        resolving FROM and TO public identities of the second IMS packet into corresponding FROM and TO private identities using the identity table; and
        in response to the resolving, determining that a combination of the FROM private identity, the TO private identity, and a call-ID associated with the second IMS packet is unique using a mapping table;
    generating, by the packet broker, a unique session identifier for the new IMS session for the second received IMS packet in response to the identifying;
    adding, by the packet broker, a combination of the FROM public identity, the TO public identity, the call-ID, and the generated unique session identifier to the mapping table; and
    adding, by the packet broker, the generated unique session identifier to the second received IMS packet.

2. The method of claim 1, further comprising:
    upon generating the unique session identifier for the new IMS session, providing the generated unique session identifier as input to a load balancing algorithm or rule set, wherein the load balancing algorithm or rule set is configured to output an egress port of the packet broker through which control packets and data packets are forwarded.

3. The method of claim 2, wherein the load balancing algorithm or rule set comprises one or more user-defined rules for assigning IMS sessions to particular analytic probes or tools connected to the packet broker.

4. The method of claim 3, wherein the one or more user-defined rules are based on characteristics of the IMS sessions.

5. The method of claim 1, further comprising:
    determining whether the first IMS packet is an initial registration, a re-registration, or a de-registration.

6. The method of claim 1, wherein the private identity is extracted from a user name header of the first IMS packet.

7. The method of claim 1, wherein the public identity is extracted from a response message for the first IMS packet.

8. The method of claim 1, wherein the identifying further comprises:
    determining whether the second IMS packet is an invite message or another type of call message.

9. The method of claim 1, further comprising:
    extracting the FROM public identity, the TO public identity, and the call-ID from the second IMS packet, wherein the extracting the FROM public identify comprises:
        in response to a FROM header of the second IMS packet including a valid public identity, extracting the FROM public identity from the FROM header;
        in response to the FROM header of the second IMS packet not including a valid public identity and the second IMS packet including a P-Asserted Identity field, extracting the FROM public identity from the P-Asserted Identity field; and
        in response to the FROM header of the second IMS packet not including a valid public identity and the second IMS packet not including a P-Asserted Identity field, extracting the FROM public identity from a P-Preferred Identity field.

10. The method of claim 1, wherein the unique session identifier is added to a subsequent IMS control packet or a subsequent IMS data packet that is determined to be part of the new IMS session based on FROM and TO public identities included in the subsequent IMS control packet or the subsequent IMS data packet.

11. The method of claim 1, further comprising:
    determining, by the packet broker, the first IMS packet is a Session Initiation Protocol (SIP) registration message.

12. A non-transitory computer readable storage medium having stored thereon program code executable by a packet broker in a visibility network, the program code causing the packet broker to:
    receive a first Internet Protocol (IP) Multimedia Subsystem (IMS) packet replicated from an IMS core network;
    add a mapping between a public identity and a private identity associated with the first IMS packet to an identity table;
    receive a second IMS packet replicated from the IMS core network;
    identify that the second IMS packet belongs to a new IMS session, wherein to identify the program code further causes the packet broker to:
        resolve FROM and TO public identities of the second IMS packet into corresponding FROM and TO private identities using the identity table; and
        in response to the resolving, determine that a combination of the FROM private identity, the TO private identity, and a call-ID associated with the second IMS packet is unique using a mapping table;
    generate a unique session identifier for the new IMS session for the second received IMS packet in response to the identifying;
    add a combination of the FROM public identity, the TO public identity, the call-ID, and the generated unique session identifier to the mapping table; and
    add the generated unique session identifier to the second received IMS packet.

13. The non-transitory computer readable storage medium of claim 12, wherein the program code further causes the packet broker to, upon generating the unique session identifier for the new IMS session:

provide the generated unique session identifier as input to a load balancing algorithm or rule set, wherein the load balancing algorithm or rule set is configured to output an egress port of the packet broker through which control packets and data packets are forwarded.

14. The non-transitory computer readable storage medium of claim 12, wherein the private identity is extracted from a user name header of the first IMS packet.

15. The non-transitory computer readable storage medium of claim 12, wherein the public identity is extracted from a response message for the first IMS packet.

16. The non-transitory computer readable storage medium of claim 12, wherein the program code further causes the packet broker to determine whether the second IMS packet is an invite message or another type of call message.

17. A packet broker comprising:
a processor; and
a non-transitory computer readable medium having stored thereon program code that, when executed by the processor, causes the processor to:
  receive a first Internet Protocol (IP) Multimedia Subsystem (IMS) packet replicated from an IMS core network;
  add a mapping between a public identity and a private identity associated with the first IMS packet to an identity table;
  receive a second IMS packet replicated from the IMS core network;
  determine the second IMS packet is a Session Initiation Protocol (SIP) call message;
  identify that the second IMS packet belongs to a new IMS session, wherein to identify further causes the processor to:
    resolve FROM and TO public identities of the second IMS packet into corresponding FROM and TO private identities using the identity table; and
    in response to the resolving, determine that a combination of the FROM private identity, the TO private identity, and a call-ID associated with the second IMS packet is unique using a mapping table;
  generate a unique session identifier for the new IMS session for the second received IMS packet in response to the identifying;
  add a combination of the FROM public identity, the TO public identity, the call-ID, and the generated unique session identifier to the mapping table; and
  add the generated unique session identifier to the second received IMS packet.

18. The packet broker of claim 17, wherein the program code further causes the processor to, upon generating the unique session identifier for the new IMS session:
  provide the generated unique session identifier as input to a load balancing algorithm or rule set, wherein the load balancing algorithm or rule set is configured to output an egress port of the packet broker through which control packets and data packets are forwarded.

19. The packet broker of claim 17, wherein the private identity is extracted from a user name header of the first IMS packet.

20. The packet broker of claim 17, wherein the public identity is extracted from a response message for the first IMS packet.

21. The packet broker of claim 17, wherein the program code further causes the processor to determine whether the second IMS packet is an invite message or another type of call message.

* * * * *